(12) United States Patent
Fuziak, Jr.

(10) Patent No.: US 7,798,638 B2
(45) Date of Patent: Sep. 21, 2010

(54) EYEGLASSES WITH INTEGRATED VIDEO DISPLAY

(75) Inventor: Robert J. Fuziak, Jr., Jackson, WY (US)

(73) Assignee: Hind-Sight Industries, Inc., Jackson, WY (US)

( * ) Notice: Subject to any disclaimer, the term of this patent is extended or adjusted under 35 U.S.C. 154(b) by 0 days.

(21) Appl. No.: 12/484,952

(22) Filed: Jun. 15, 2009

(65) Prior Publication Data

US 2009/0251661 A1 Oct. 8, 2009

Related U.S. Application Data

(63) Continuation-in-part of application No. 11/619,144, filed on Jan. 2, 2007, now Pat. No. 7,547,101.

(51) Int. Cl.
*G02C 1/00* (2006.01)
(52) U.S. Cl. .......................... 351/158; 345/7
(58) Field of Classification Search ................. 351/158, 351/41, 111, 121; 345/7, 8; 348/207.1, 62, 348/42
See application file for complete search history.

(56) References Cited

U.S. PATENT DOCUMENTS

| 4,493,538 | A | 1/1985 | Tolliver |
|---|---|---|---|
| 5,886,822 | A | 3/1999 | Spitzer |
| 6,065,832 | A | 5/2000 | Fuziak |
| 6,073,033 | A | 6/2000 | Campo |
| 6,349,001 | B1 | 2/2002 | Spitzer |
| 7,048,370 | B2 | 5/2006 | Starner et al. |
| 7,310,072 | B2 | 12/2007 | Ronzani et al. |
| 7,325,922 | B2 | 2/2008 | Spivey |
| 7,484,847 | B2 | 2/2009 | Fuziak, Jr. |
| 7,547,101 | B2 | 6/2009 | Fuziak, Jr. |
| 2005/0237271 | A1 | 10/2005 | Yamamoto |
| 2008/0198324 | A1 | 8/2008 | Fuziak |
| 2009/0109395 | A1* | 4/2009 | Fuziak, Jr. .................. 351/158 |

OTHER PUBLICATIONS

International Search Report for PCT/US07/88844, International Searching Authority, Oct. 6, 2008, pp. 1-10.
International Search Report for PCT/US08/070513, International Searching Authority, Nov. 7, 2008, pp. 1-9.
Notice of Allowance, U.S. Appl. No. 11/780,001, pp. 1-10.
Non-Final Office Action, U.S. Appl. No. 11/619,144, pp. 1-8.
www.MACLIFE.com, Jan. 2010, No. 36, pp. 1-3.
Non-Final Office Action, U.S. Appl. No. 12/348,239, pp. 1-6.

* cited by examiner

*Primary Examiner*—Hung X Dang
(74) *Attorney, Agent, or Firm*—Samuel M. Freund; Cochran Freund & Young LLC

(57) ABSTRACT

Eyeglasses including at least one video display that may be pivoted forwardly and outwardly to a viewing position in front of the lenses of the eyeglasses, and folded rearwardly and inwardly to a stored position for retention by the ear pieces of the eyeglasses when not in use are described. When the at least one video display is disposed in the rearward, folded configuration against or within receiving portions of the temple members of the eyeglasses, the eyeglasses present the appearance and function of conventional eyewear. Video signals may be generated by at least one camera integrated with the eyeglasses, or by an external source thereof.

31 Claims, 7 Drawing Sheets

EYEGLASSES WITH INTEGRATED VIDEO DISPLAY

RELATED CASES

The present patent application is a continuation-in-part application of U.S. patent application Ser. No. 11/619,144 filed Jan. 2, 2007 for "EYEGLASSES WITH INTEGRATED TELESCOPING VIDEO DISPLAY" which issued to Robert J. Fuziak, Jr. on 16 Jun. 2009, now U.S. Pat. No. 7,547,101, the disclosure and teachings of which are hereby incorporated by reference herein.

FIELD OF THE INVENTION

The present invention relates generally to eyeglasses and, more particularly, to eyeglasses adapted for viewing video signals while having the appearance and function of ordinary eyewear.

BACKGROUND OF THE INVENTION

As computerized display screens continue to be made smaller and lighter, many applications for their use present themselves. Eyeglasses having liquid crystal display (LCD) screens and earphones are currently available, but such eyewear does not retain the appearance of conventional or stylish optical glasses or sunglasses. Detachable viewers for mounting to conventional eyewear for either right or left eye viewing and liquid-crystal glasses having clear optics adapted to fit over prescription eyewear are examples.

U.S. Pat. No. 6,065,832 for "Eyeglasses With Integrated Rear View Mirrors" which issued to Robert J. Fuziak on May 23, 2000, describes a pair of eyeglasses including rear view mirrors, each having a mirror surface that may be folded forwardly and outwardly to an open position for use, and that may also be folded rearwardly and inwardly to a closed position for retention by the temple members of the eyeglasses when not in use, such that when in the closed position against the temple members, the eyeglasses present the appearance of conventional eyeglasses.

SUMMARY OF THE INVENTION

Accordingly, it is an object of the present invention to provide eyeglasses suitable for viewing video signals, while maintaining the appearance and function of ordinary eyewear when the displays are not in use.

Another object of the invention is to provide eyeglasses suitable for viewing video signals and for obtaining still or video camera pictures, while maintaining the appearance and function of ordinary eyewear when the displays are not in use.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the video display integrally combined with a pair of eyeglasses, hereof, includes in combination: a frame having left and right temple extension portions extending rearward at left and right sides thereof; left and right lenses mounted within the frame; left and right ear pieces at least one each ear piece having a receiving portion on an outer surface thereof; a right, single-axis pivot member for pivotably attaching the right ear piece to the right temple extension portion of the frame, and a left, single-axis pivot member for pivotably attaching the left ear piece to the left temple extension portion of the frame; at least one single-axis pivot member having the pivot axis thereof collinear with either the axis of the right pivot member or the axis of the left pivot member; at least one video display holder having a top edge and a bottom edge, and a first surface facing the frame; at least one video display disposed on the first surface; a two-axis pivot member attached to the at least one video display holder between the top edge and the bottom edge thereof; an arm having an end thereof pivotably attached to the single-axis pivot member, and the opposite end thereof pivotably attached to the two-axis pivot member; and means for providing a video signal to the at least one video display, whereby the at least one video display can be disposed in front of one of the left lens or the right lens, or be disposed in the receiving portion of the left ear piece or the right ear piece, respectively.

In another embodiment of the invention and in accordance with its objects and purposes, the video display integrally combined with a pair of eyeglasses, hereof, includes in combination: a frame having a left side and a right side; left and right lenses mounted within the frame; left and right ear pieces, at least one ear piece having a receiving portion on an outer surface thereof; a right, single-axis pivot member for pivotably attaching the right ear piece to the right side of the frame, and a left, single-axis pivot member for pivotably attaching the left ear piece to the left side of the frame; at least one single-axis pivot member having the pivot axis thereof collinear with either the axis of the right pivot member or the axis of the left pivot member; at least one video display holder having a top edge and a bottom edge, and a first surface facing the frame; at least one video display disposed on the first surface; a second single-axis pivot member attached to the at least one display holder between the top edge and the bottom edge thereof; an arm having an end thereof pivotably attached to the at least one single-axis pivot member, and the opposite end thereof pivotably attached to the second single-axis pivot member; and means for providing a video signal to the at least one video display, whereby the at least one video display can be disposed in front of one of the left lens or the right lens, or be disposed in the receiving portion of the left ear piece or the right ear piece, respectively.

In yet another embodiment of the invention and in accordance with its objects and purposes, the video display integrally combined with a pair of eyeglasses, hereof, includes in combination: a frame having a left side and a right side; left and right lenses mounted within the frame; left and right temple ear pieces at least one ear piece having a receiving portion on an outer surface thereof; a right, single-axis pivot member for pivotably attaching the right ear piece to the right side of the frame, and a left, single-axis pivot member for pivotably attaching the left ear piece to the left side of the frame; a single-axis pivot member having the pivot axis thereof collinear with either the axis of the right pivot member or the axis of the left pivot member; at least one video display holder having a top edge and a bottom edge, and a first surface facing the frame; at least one video display disposed on the first surface; a three-axis pivot member attached to the at least one display holder between the top edge and the bottom edge thereof; an arm having an end thereof pivotably attached to the single-axis pivot member, and the opposite end thereof pivotably attached to the three-axis pivot member; and means for providing a video signal to the at least one video display, whereby the at least one video display can be disposed in front of one of the left lens or the right lens, or be disposed in the receiving portion of the left ear piece or the right ear piece, respectively.

Benefits and advantages of the present invention include, but are not limited to, an integrated eyeglass system adapted for viewing at least one video display through a corresponding lens thereof while appearing and functioning like ordinary eyewear when the at least one display is pivoted out of the way of the corresponding lens and stored in or on the corresponding ear piece. The location of the at least one video display away from a user's eyes provides additional safety over many current wearable display systems.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a schematic representation of an embodiment of the eyeglasses of the present invention having rearward extending left and right temple extension portions at left and right sides thereof, wherein the at least one video display holder is shown in its deployed position with a camera facing away from the lenses; while

FIG. 3A is a schematic representation of an embodiment of the eyeglasses of the present invention without rearward extending left and right temple extension portions, wherein the at least one video display holder is shown in its deployed position with a camera facing away from the lenses; while

DETAILED DESCRIPTION OF THE INVENTION

Briefly, the present invention includes eyeglasses adapted for viewing video signals, while maintaining the appearance and function of ordinary eyewear. By employing at least one pivoted arm, upon which a viewing screen is disposed, video signals may be viewed at adjustable distances from a viewer's eyes. The at least one arm may be a telescoping arm. Electronics such as video receivers and amplifiers, audio receivers and amplifiers, Bluetooth components, still and/or video cameras, including night-vision cameras and cameras having electrical and/or optical zoom capability, earphones, microphones, as examples; flash memory card readers, as an example, for driving and complementing the video displays; power supplies, such as batteries; and electrical connections among the various components, may be mounted on and/or in the eyeglasses, may be plugged into the eyeglasses or worn on the body of the user of the eyeglasses, or be used in various combinations thereof as is suitable for the intended applications in ways known to those having skill in the audio/video arts. It should be mentioned that at least some of the electrical components may cooperate using wireless technology.

Current wearable display systems may give rise to safety concerns since viewing screens are commonly located on the inside of the eyewear; that is, between the lenses and the user's eyes. The present invention, by contrast, places the viewing screen(s) on the opposite side of the lenses from the user's eyes. To further increase safety, the lenses of the present invention may be made from shatter proof materials. This may be of significance for military applications.

Figure 1A:
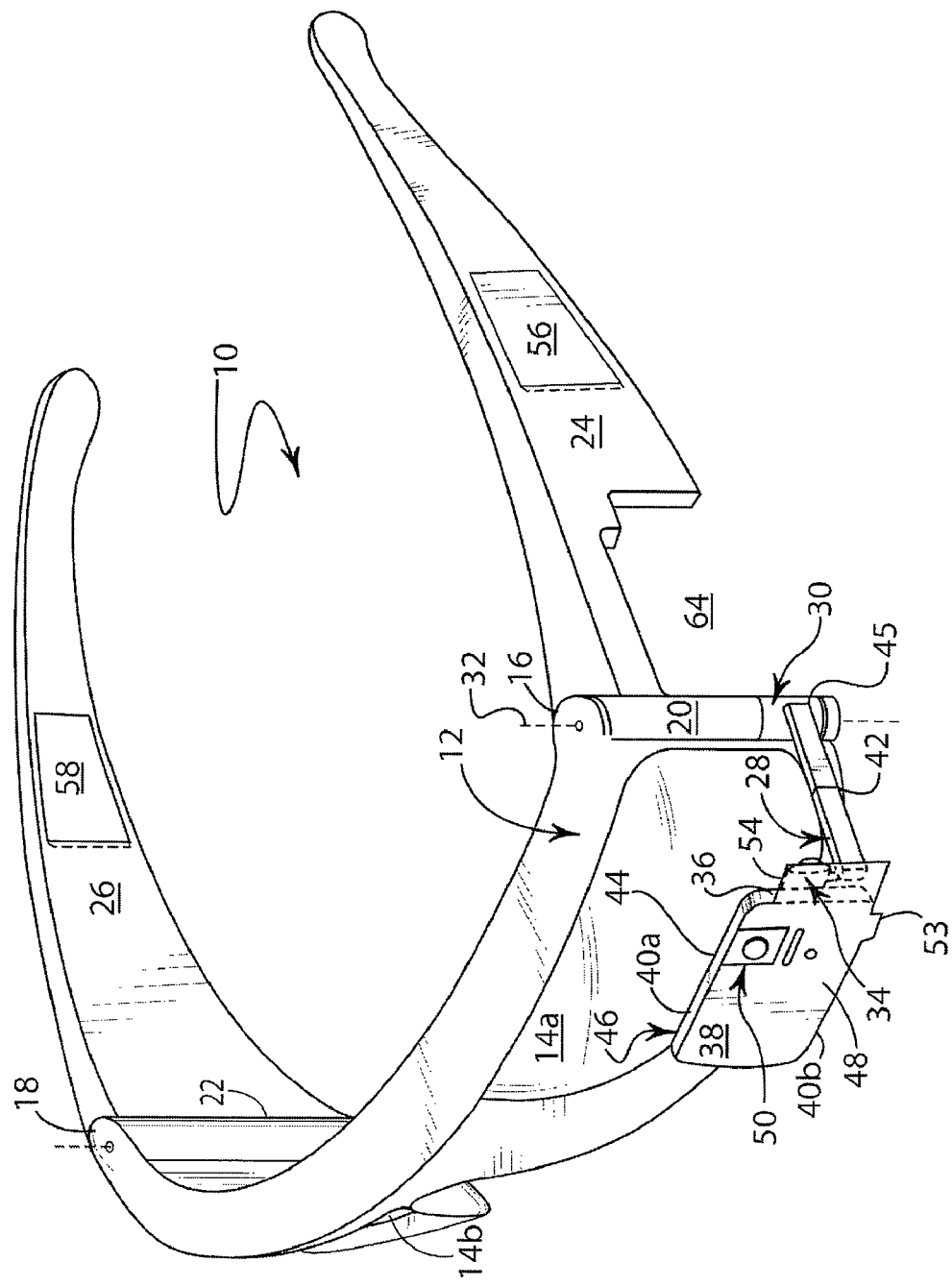
FIG. 1A is a schematic representation of an embodiment of the eyeglasses of the present invention having rearward extending left and right temple extension portions at left and right sides thereof, wherein the at least one video display holder is shown in its deployed position with a camera, flash attachment and microphone facing away from the lenses.

Reference will now be made in detail to the present preferred embodiments of the inventions, examples of which are illustrated in the accompanying drawings. In the Figures, similar or identical structure will be identified using identical reference characters. Turning now to FIG. 1A, eyeglasses, 10, are shown which may have a rearwardly curved frame member, 12, for retaining conventional lenses, 14a and 14b, which may be prescription lenses, shatterproof lenses, sun-protection lenses, and the like, and may be made from glass or plastic materials, as examples. Although the FIGURES illustrate lenses 14a and 14b as being fixed lenses, it is contemplated that lenses 14a and 14b may be removable to accommodate prescription lenses including multifocal lenses, and/or tinted lenses. Frame member 12 includes temple extension portions, 16 and 18, which may extend outwardly and rearwardly at the left and right sides thereof, respectively. Each of the temple extension portions 16 and 18 of frame member 12 includes left and right, single-axis temple member or ear piece hinges, 20 and 22, respectively, by which left and right temple members (ear pieces), 24 and 26, are hingedly attached to frame member 12, respectively.

Arm, 28, is pivotably connected to frame 12 by single-axis pivot member, 30, having an axis collinear with axis, 32, of left pivot member 20, on one end thereof. The other end of arm 28 is pivotably connected to two-axis pivot member, 34, which pivot member is attached to proximal edge, 36, of the at least one video display holder, 38, between the upper edge, 40a, and the lower edge, 40b, thereof. Display holder 38 is illustrated in its unfolded or deployed position. FIG. 1A shows pivot member 30 disposed below left pivot 20. Clearly, pivot member 30 may be placed above left pivot member 20 (not shown in the FIGURES) for some applications with suitable rearrangement of the receiving portion or compartment for display holder 38 in ear piece 24. Further, as an example, pivot member 30 may be placed between split left pivots 20 (not shown in the FIGURES), if display holder 38 is to be disposed centrally to lens 14a. These variations permit a user to see through lenses 14a and 14b around display holder 38 when display holder 38 is in its deployed condition. Arm 28 may be a telescoping arm, 42, to assist in placing video display holder 38 at an effective distance in front of the eyes of a wearer of glasses 10, and/or for storing the video display holder in the temple members as will be described hereinbelow.

Attachment location, 43, of pivot member 34 may be tilted toward lens 14a in order that arm 28 may be folded against front (inner) surface 44 of display holder 38 when display holder 38 is in its stored position. Additionally, arm 28 is shown affixed, 45, to pivot 30 on the surface thereof to the outside of diameter 32 (FIGS. 1A, 1B and 2A) such that display holder 38 may fit flush against the outer surface of ear piece 24 when in its stored, out-of-the way position in the receiving portion thereof. Display holder 38 is shown covering the lower portion of lens 14a, although many variations thereof may be contemplated, two variations thereof having been described hereinabove, wherein pivot member 30 is placed above left pivot member 20, or between split left pivots.

Inner surface, 44, of video display holder 38 includes video display, 46, that may be bonded thereto by conventional means. Video display 46 may be liquid crystal displays, organic semiconductor displays or nanotube-based displays, as examples.

Outer surface, 48, of video display holder 38 may hold camera, 50, which may be a still camera or a video camera, a combination thereof. Camera 50 may be a night-vision camera and/or a camera having electrical and/or optical zoom capability. Microphone, 51, and flash attachment, 52, may also be included on outer surface 48.

Tab or fin, 53, may assist in adjusting video display holder 38 in front of lens 14a, and in moving display holder 38 to its folded position, as will be described hereinbelow. Cover, 54, may be used to conceal two-axis pivot member 34 when display holder 38 is in its folded position, as also will be described hereinbelow.

Electronic components, power sources, and electrical connections therebetween may be housed in compartments, 56 and 58, depending on the thickness of temple members 24 and 26, and the size of the desired components. Frame 12 may be used to provide additional concealed housing as well. In other embodiments of the invention, electrical connections may be provided in compartments 58 and 60 for placing electronic components and power sources in electrical communication with video displays 46. Electrical connections (not shown in the FIGURES) among various components would be made depending on the types of components and power sources employed, and would be understood by those having skill in the audio and video arts. As mentioned hereinabove, wireless communication between components is also anticipated.

Figure 1B:
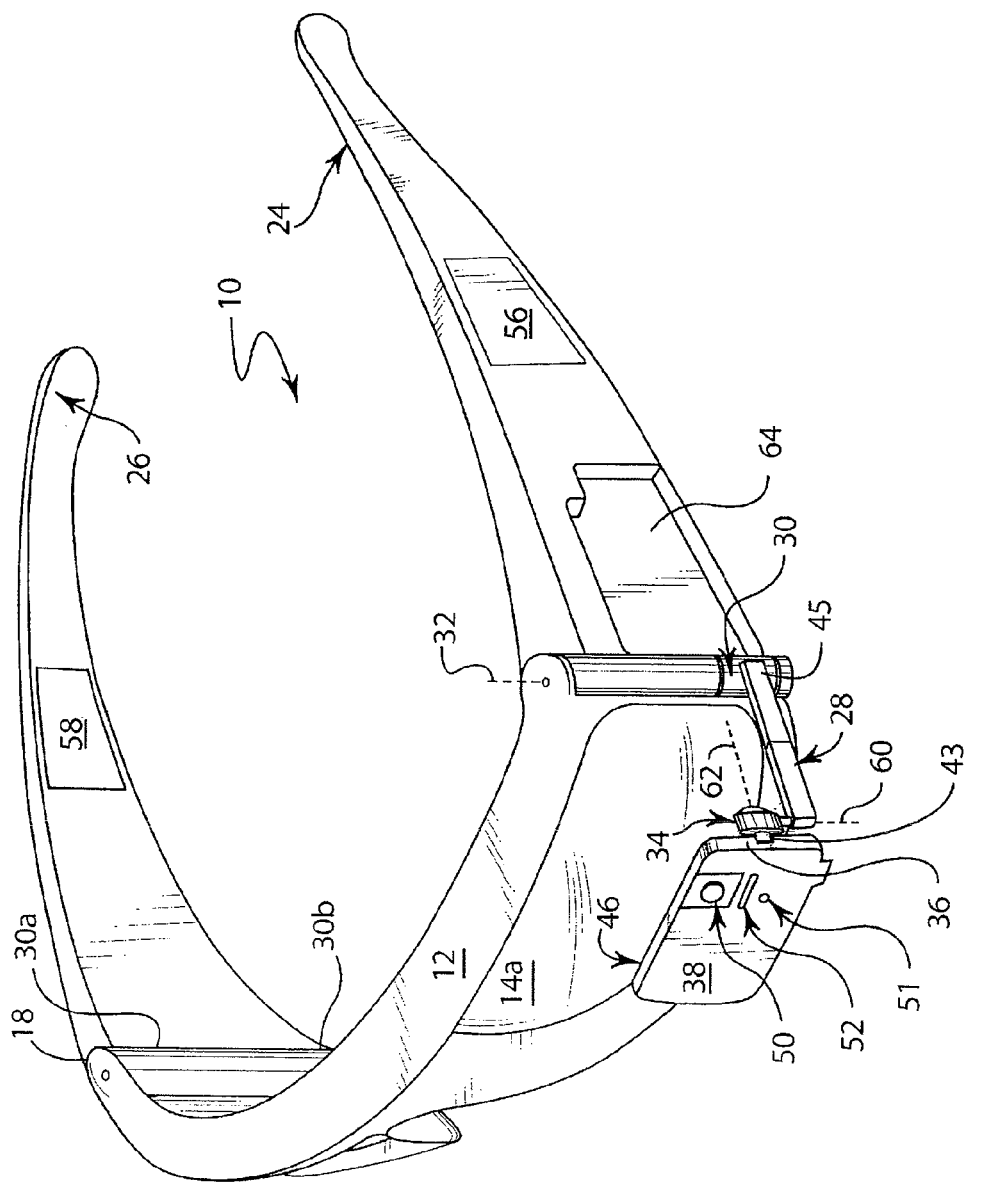
FIG. 1B is a schematic representation of the eyeglasses shown in FIG. 1A hereof with the cover portion shielding a two-axis pivot member removed to better reveal the attachment of the two-axis pivot member to an edge of the video display holder between the top and bottom edges thereof.

FIG. 1B is a schematic representation of the eyeglasses shown in FIG. 1A hereof with cover 54 shielding two-axis pivot member 34 removed to better reveal the two-axis pivot member having pivot axes, 60 and 62 and attached to edge 36 of video display holder 38. Two-axis pivot member 34 may also be attached to inner surface 44 of video display 46 in order to permit arm 28 to fold against inner surface 44 when display holder 38 is in its folded location, for some designs of pivot member 34. Also shown in FIG. 1B is receiving portion, 64, which may be an indentation, depression or compartment, fashioned in temple member 24 for storing video display holder 38. It should be mentioned that the receiving portion 64, illustrated in FIGS. 1A-1C hereof, may be cut through the entire thickness of the ear piece 24 in some circumstances to provide a sleeker profile.

Figure 1C:
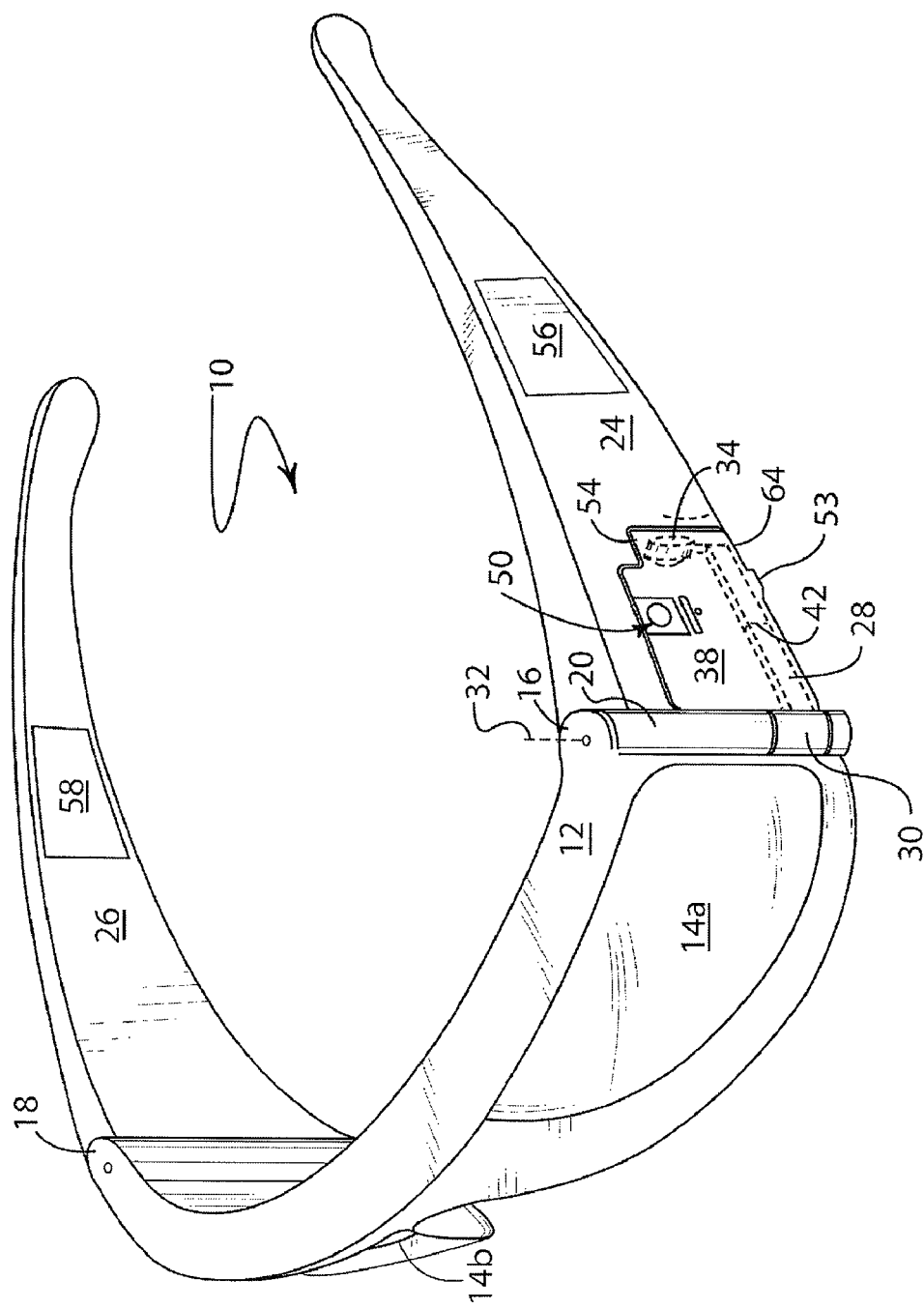
FIG. 1C is a schematic representation of the eyeglasses shown in FIG. 1A hereof illustrating the video display holder in its stored position in a receiving portion in the left temple member, the cover portion covering the pivot member enhancing the smooth appearance of the left ear piece when the video display holder is stored therein.

FIG. 1C is a schematic representation of the eyeglasses shown in FIG. 1A hereof illustrating video display holder 38 in its storage position in indentation 64 in left temple member 24, cover 54 for concealing pivot member 34 enhancing the smooth appearance of the left temple member when the video display holder is stored therein. Video display holder 38 may be pivoted rearwardly into its retracted or stored position in receiving portion 64 in temple member 24 adapted to receive video display holder 38 and attached video display 46. Display holder 38 is thereby retained in a retracted position, and eyeglasses 10 have the appearance of ordinary eyewear, that is, arm 28 and pivot member 34 are not visible. It should be mentioned that surface 48 of display holder 38 may be provided with a convex shape in order to fit the curvature of earpiece 24 if this temple member has significant curvature. For some applications, telescoping arm feature 42, if provided in arm 28, may assist in producing a more compact storage of display holder 38.

Clearly, a right video display holder (not shown in the FIGURES) having associated components may be included, for some applications.

In use, the video display holder 38 is pivoted forwardly into the position illustrated in FIGS. 1A and 1B such that the wearer of eyeglasses 10 may view video display 46. When not in use, video display holder 38 may be quickly and easily pivoted rearwardly, as may be illustrated with video display holder 38 in FIG. 1C, wherein video display 46 may be disposed against temple member 24 and retained in that position. Electrical connections might be removed and stored as appropriate. As stated hereinabove, electrical connections may not be required should wireless components be employed.

Figure 2A:
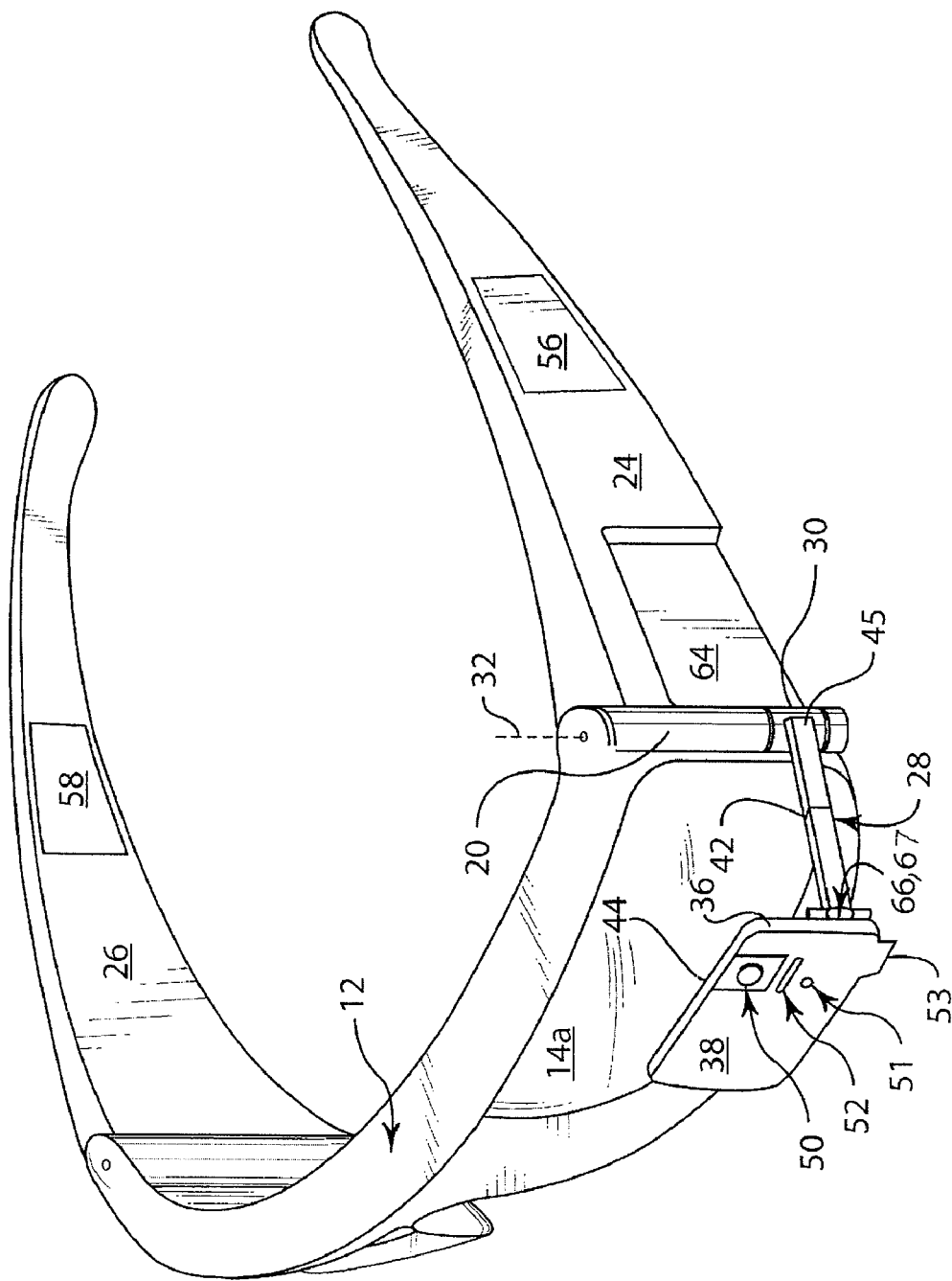
Figure 2B:
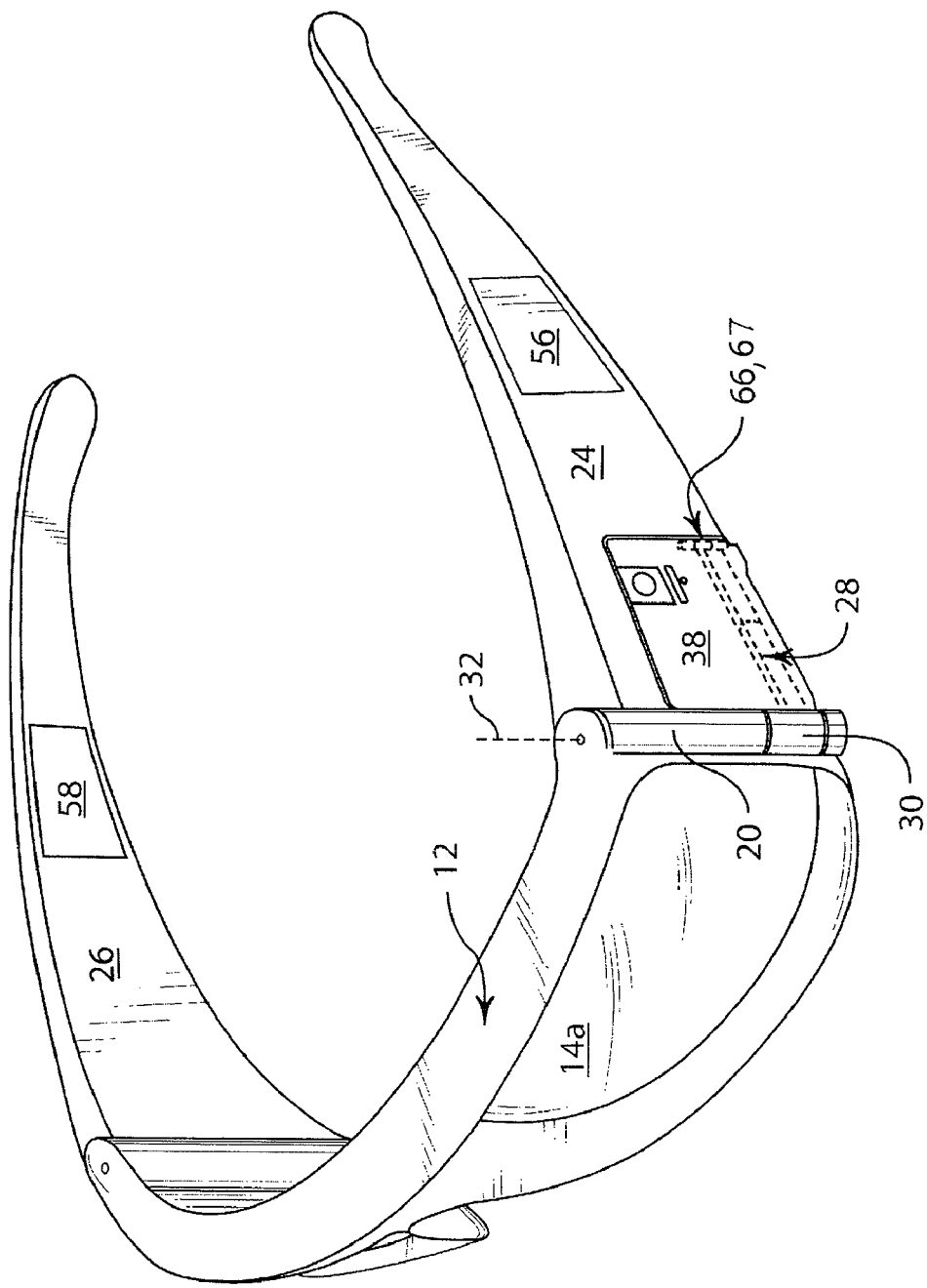
FIG. 2B is a schematic representation of the eyeglasses shown in FIG. 2A hereof illustrating the video display holder in its storage position in a receiving portion in the left ear piece, and a ball-type pivot member mounted to the surface of the video display holder facing the frame in the vicinity of an edge between the upper and lower edges thereof, thereby permitting the display holder to conceal the pivot member.

FIG. 2A is a schematic representation of an embodiment of the eyeglasses of the present invention having rearward extending left and right temple extension portions at left and right sides thereof, wherein the at least one video display holder is shown in its deployed position with a camera facing away from the glasses frame, and FIG. 2B is a schematic representation of the eyeglasses shown in FIG. 2A hereof illustrating the video display holder in its storage position in an indentation in the left temple member, ball-type pivot member (three-axis), 66, mounted to the surface of the video display holder facing the frame in the vicinity of an edge between the upper and lower edges thereof, and permitting the display holder to conceal the pivot member. It should be mentioned that if ball-type pivot member 66 is replaced with a hinge-type pivot having two vertically oriented leaves, as an example, with one leaf thereof being affixed to arm 28 and the other to display holder 38 (not shown in FIG. 2A), three-axis pivot member 66 becomes second single-axis pivot member, 67 (the other single-axis pivot member 30 having its axis disposed collinearly with the axis of single-axis pivot member 20). Additionally, although pivot member 66 is shown mounted on front surface 44, of display holder 38, for some designs of pivot member 66, pivot member 66 may be mounted on the proximal edge 36 of display holder 38.

Figure 3A:
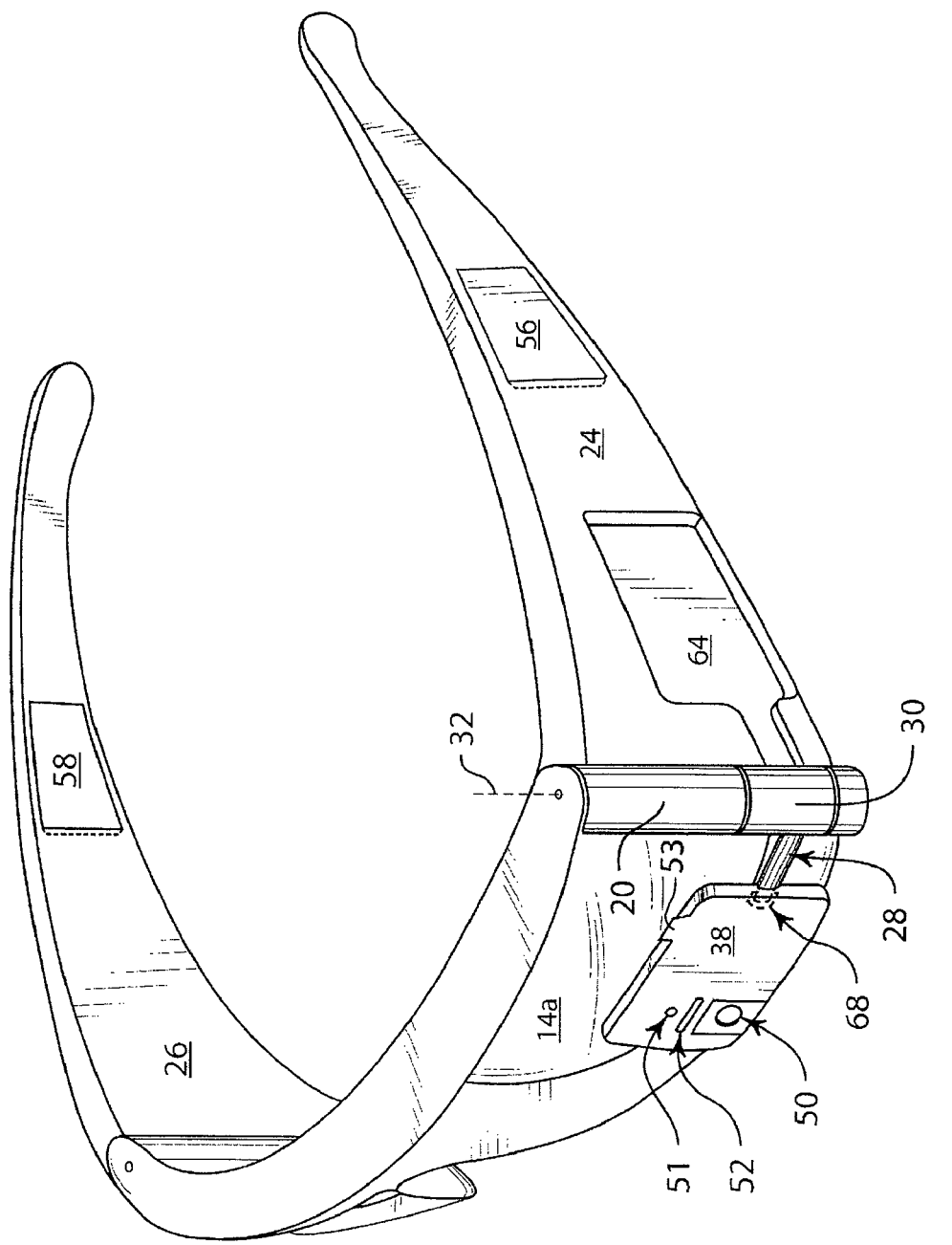
Figure 3B:
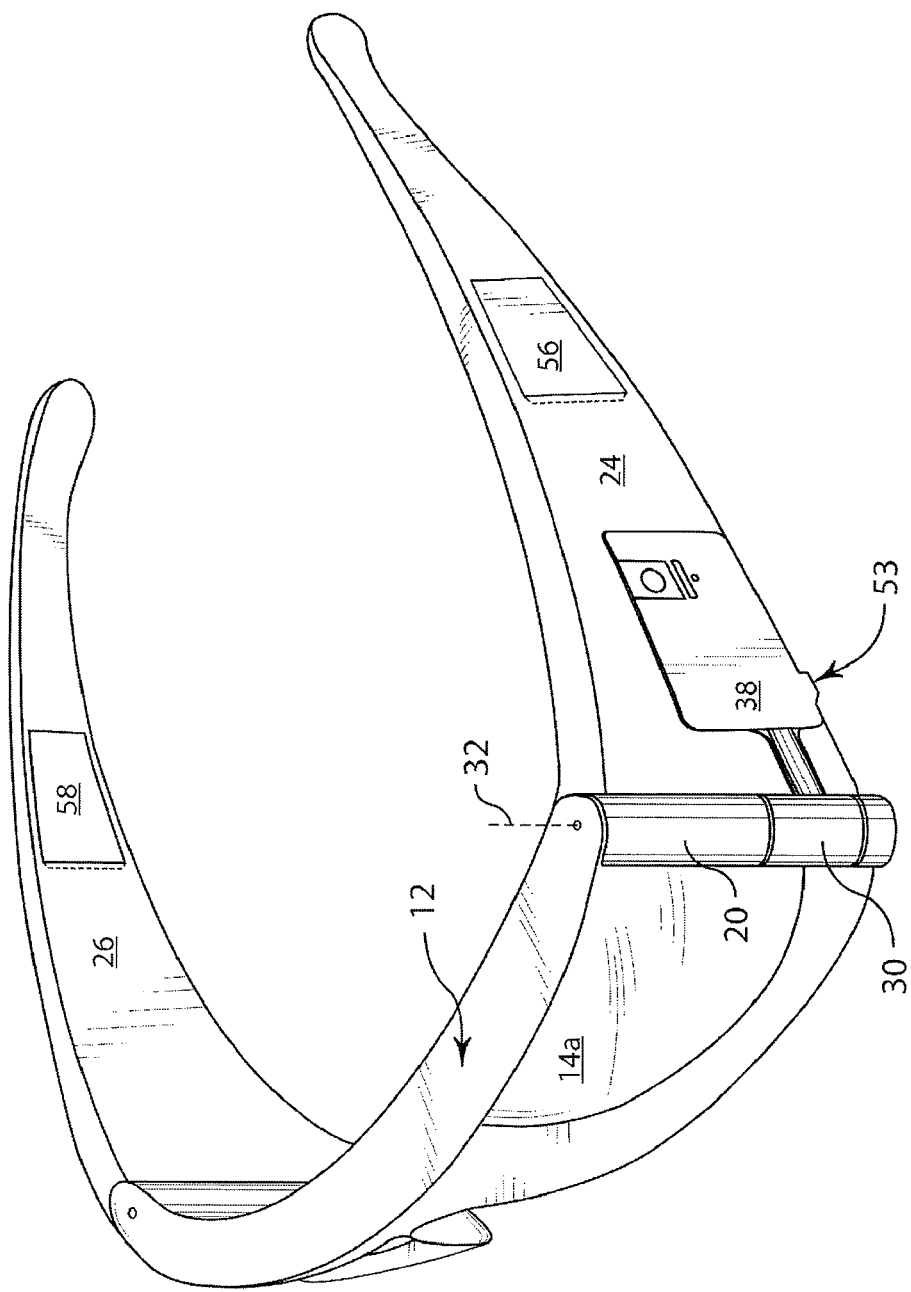
FIG. 3B is a schematic representation of the eyeglasses shown in FIG. 3A hereof illustrating the video display holder in its storage position in a receiving portion in the left ear piece, and another ball-type embodiment of the three-axis, ball-type pivot member mounted to an edge of the video display holder between the upper and lower edges thereof, thereby permitting the display holder conceal the pivot member.

FIG. 3A is a schematic representation of an embodiment of the eyeglasses of the present invention not having rearward extending left and right temple extension portions at left and right sides thereof, wherein the at least one video display holder is shown in its deployed position with a camera facing away from the glasses frame, and FIG. 3B is a schematic representation of the eyeglasses shown in FIG. 3A hereof illustrating the video display holder in its storage position in an indentation in the left temple member, another embodiment of the ball-type pivot member (three-axis), 68, mounted to an edge of the video display holder between the upper and lower edges thereof, and permitting the display holder conceal the pivot member. In this embodiment camera 50 is shown on the lower portion of surface 48 of display holder 38 in its deployed location.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A video display integrally combined with a pair of eyeglasses, comprising in combination:
   a frame having left and right temple extension portions extending rearwardly at left and right sides thereof;
   left and right lenses mounted within said frame;
   left and right ear pieces, at least one ear piece having a receiving portion on an outer surface thereof;
   a right, single-axis pivot member for pivotably attaching said right ear piece to said right temple extension portion of said frame;
   a left, single-axis pivot member for pivotably attaching said left ear piece to said left temple extension portion of said frame;
   at least one single-axis pivot member having the pivot axis thereof collinear with either the axis of said right pivot member or the axis of said left pivot member;
   at least one video display holder having a top edge and a bottom edge, and a surface facing said frame;
   at least one video display disposed on the surface facing said frame;
   a two-axis pivot member attached to said at least one display holder between the top edge and the bottom edge thereof;
   an arm having an end thereof pivotably attached to said single-axis pivot member, and the opposite end thereof pivotably attached to said two-axis pivot member; and
   means for providing a video signal to said at least one video display, whereby said at least one video display can be disposed in front of one of said left lens or said right lens, or be disposed in the receiving portion of said left ear piece or said right ear piece, respectively.

2. The apparatus of claim 1, wherein the receiving portion of said at least one ear piece extends from the outer surface thereof through an opposing inner surface.

3. The apparatus of claim 1, wherein said at least one video display holder comprises a surface facing away from said frame, said apparatus further comprising a camera disposed on the surface facing away from said frame.

4. The apparatus of claim 3, wherein said camera comprises a video camera.

5. The apparatus of claim 3, further comprising a flash attachment and a microphone disposed on the surface facing away from said frame.

6. The apparatus of claim 1, wherein a flat fin is formed on said at least one video display holder such that said at least one video display holder can more easily be extracted from the at least one receiving portion of said right ear piece or said left earpiece when disposed therein.

7. The apparatus of claim 1, wherein said two-axis pivot member is attached to an edge of said at least one video display holder between the top edge and the bottom edge thereof.

8. The apparatus of claim 1, wherein said means for providing a video signal to said at least one video display comprises a video receiver, a video amplifier, means for controlling said video receiver and said video amplifier, and a power source suitable for powering said video receiver, said video amplifier and said controlling means.

9. The apparatus of claim 8, wherein said video receiver, said video amplifier, said controlling means, and said power supply are disposed in at least one of said frame, said right ear piece and said left ear piece.

10. The apparatus of claim 1, wherein said arm comprises a telescoping arm.

11. A video display integrally combined with a pair of eyeglasses, comprising in combination:
    a frame having a left side and a right side; left and right lenses mounted within said frame;
    left and right ear pieces at least one of said ear pieces having a receiving portion on an outer surface thereof;
    a right, single-axis pivot member for pivotably attaching said right ear piece to the right side of said frame, and a left, single-axis pivot member for pivotably attaching said left ear piece to the left side of said frame;
    a single-axis pivot member having the pivot axis thereof collinear with either the axis of said right pivot member or the axis of said left pivot member; at least one video display holder having a top edge and a bottom edge, and a surface facing said frame;
    at least one video display disposed on the surface facing said frame;
    a second single-axis pivot member disposed between the top edge and the bottom edge of said at least one display holder;
    an arm having an end thereof pivotably attached to said single-axis pivot member, and the opposite end thereof pivotably attached to said second single-axis pivot member; and
    means for providing a video signal to said at least one video display, whereby said at least one video display can be disposed in front of one of said left lens or said right lens, or be disposed in the receiving portion of said left ear piece or said right ear piece, respectively.

12. The apparatus of claim 11, wherein the receiving portion in said at least one ear piece extends from the outer surface thereof through an opposing inner surface.

13. The apparatus of claim 11, wherein said at least one video display holder comprises a surface facing away from said frame, said apparatus further comprising a camera disposed on the surface facing away from said frame.

14. The apparatus of claim 13, wherein said camera comprises a video camera.

15. The apparatus of claim 13, further comprising a flash attachment and a microphone disposed on the surface facing away from said frame.

16. The apparatus of claim 11, wherein a tab is formed on said at least one video display holder such that said at least one video display holder can more easily be extracted from the receiving portion of said right ear piece or said ear piece when disposed therein.

17. The apparatus of claim 11, wherein said second single-axis pivot member is attached to an edge of said at least one video display holder between the top edge and the bottom edge thereof.

18. The apparatus of claim 11, wherein said means for providing a video signal to said at least one video display comprises a video receiver, a video amplifier, means for controlling said video receiver and said video amplifier, and a power source suitable for powering said video receiver, said video amplifier and said controlling means.

19. The apparatus of claim 18, wherein said video receiver, said video amplifier, said controlling means, and said power supply are disposed in at least one of said frame, said right ear piece and said left ear piece.

20. The apparatus of claim 11, wherein said frame is curved in the direction of said left temple member and said right temple member.

21. The apparatus of claim 11, wherein said arm comprises a telescoping arm.

22. A video display integrally combined with a pair of eyeglasses, comprising in combination:
   a frame having a left side and a right side; left and right lenses mounted within said frame;
   left and right ear pieces each ear piece having an indentation on an outer surface thereof; a right, single-axis pivot member for pivotably attaching said right ear piece to the right side of said frame, and a left, single-axis pivot member for pivotably attaching said left ear piece to the left side of said frame;
   a single-axis pivot member having the pivot axis thereof collinear with either the axis of said right pivot member or the axis of said left pivot member; at least one video display holder having a top edge and a bottom edge, and a surface facing said frame; at least one video display disposed on the surface facing said frame;
   a three-axis pivot member attached to said at least one display holder between the top edge and the bottom edge thereof;
   an arm having an end thereof pivotably attached to said single-axis pivot member, and the opposite end thereof pivotably attached to said three-axis pivot member;
   and means for providing a video signal to the at least one video display, whereby said at least one video display can be disposed in front of one of said left lens or said right lens, or be disposed in the receiving portion of the outer side of said left ear piece or said right ear piece, respectively.

23. The apparatus of claim 22, wherein said at least one video display holder comprises a surface facing away from said frame, said apparatus further comprising a camera disposed on the surface facing away from said frame.

24. The apparatus of claim 23, wherein said camera comprises a video camera.

25. The apparatus of claim 22, wherein a tab is formed in the surface facing away from said frame in said at least one video display holder such that said at least one video display holder can more easily be extracted from the indentation in said right temple member or said left temple member when disposed therein.

26. The apparatus of claim 22, wherein said three-axis pivot member is attached to an edge of said at least one video display holder between the top edge and the bottom edge thereof.

27. The apparatus of claim 22, wherein said three-axis pivot member is attached to the surface facing said frame of said at least one video display holder between the top edge and the bottom edge thereof.

28. The apparatus of claim 22, wherein said means for providing a video signal to said at least one video display comprises a video receiver, a video amplifier, means for controlling said video receiver and said video amplifier, and a power source suitable for powering said video receiver, said video amplifier and said controlling means.

29. The apparatus of claim 28, wherein said video receiver, said video amplifier, said controlling means, and said power supply are disposed in one or more of said frame, said right temple member and said left temple member.

30. The apparatus of claim 22, wherein said frame is curved in the direction of said left temple member and said right temple member.

31. The apparatus of claim 22, wherein said arm comprises a telescoping arm.

* * * * *